| United States Patent [19] | [11] Patent Number: 4,690,257 |
| --- | --- |
| Suzuki et al. | [45] Date of Patent: Sep. 1, 1987 |

[54] SPEED RESPONSIVE CENTRIFUGAL CLUTCH WITH A SERIAL CIRCUMFERENTIAL ARRANGEMENT OF SHOE ASSEMBLIES AND DAMPERS

[75] Inventors: Akimitsu Suzuki; Toshio Awaji; Kozaburo Igari, all of Fujisawa, Japan

[73] Assignee: NSK-Warner Kabushiki Kaisha, Tokyo, Japan

[21] Appl. No.: 757,035

[22] Filed: Jul. 19, 1985

[30] Foreign Application Priority Data

Jul. 20, 1984 [JP] Japan ................................ 59-149617

[51] Int. Cl.⁴ ............................................. F16B 43/18
[52] U.S. Cl. .............................. 192/3.31; 192/105 BA; 192/106.2
[58] Field of Search ............. 192/3.31, 106.2, 105 BA

[56] References Cited

U.S. PATENT DOCUMENTS

| Re. 31,621 | 7/1984 | Moroto et al. | 192/106.2 X |
| 2,754,948 | 7/1956 | Pohl | 192/105 BA |
| 4,037,691 | 7/1977 | Ivey | 192/3.31 |
| 4,113,075 | 9/1978 | Walker | 192/3.31 |
| 4,117,918 | 10/1978 | Silberschlag | 192/3.31 X |
| 4,226,309 | 10/1980 | Silberschlag | 192/3.31 |
| 4,232,534 | 11/1980 | Lamarche | 192/106.2 X |
| 4,289,220 | 9/1981 | Onuma et al. | 192/106.2 X |
| 4,305,493 | 12/1981 | Silberschlag | 192/3.31 X |
| 4,383,596 | 5/1983 | Jackel | 192/3.31 |
| 4,427,400 | 1/1984 | Lamarche | 192/106.2 X |
| 4,430,064 | 2/1984 | Lamarche | 192/106.2 X |
| 4,548,311 | 10/1985 | Lech | 192/106.2 |
| 4,560,366 | 12/1985 | Loizeau | 192/106.2 X |

*Primary Examiner*—Rodney H. Bonck
*Attorney, Agent, or Firm*—Thomas S. MacDonald; Alan H. MacPherson; Steven F. Caserza

[57] ABSTRACT

A speed responsive clutch assembly includes a generally disc-shaped clutch plate fixedly mounted on a rotating shaft on the driven side of the clutch assembly and a reaction ring supported by the clutch plate so as to be rotatable relative to the clutch plate over a predetermined angle. The clutch assembly also includes a plurality of shoe assemblies which are mounted on the reaction ring so as to be movable radially outward until they come into frictional contact with a casing, which is connected to a driving source, thereby establishing a coupled condition as the centrifugal force acting on the shoe assemblies increases. The assembly also includes a plurality of damper members interposed between the clutch plate and the reaction ring so that the rotational force can be transmitted between the clutch plate and the reaction ring through the damper members. Those shoe assemblies and damper members are arranged substantially along the same circumference.

12 Claims, 19 Drawing Figures

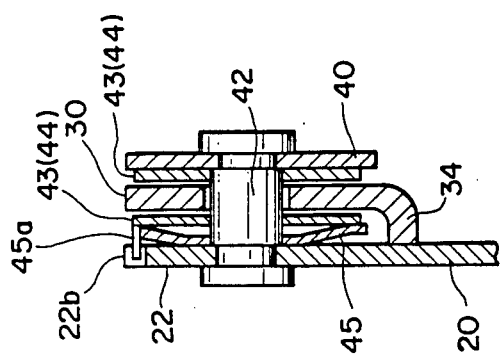

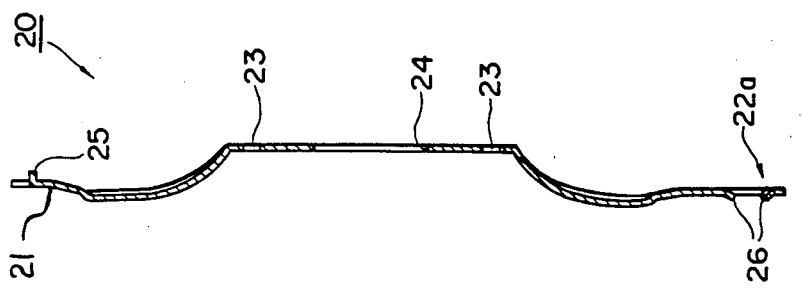
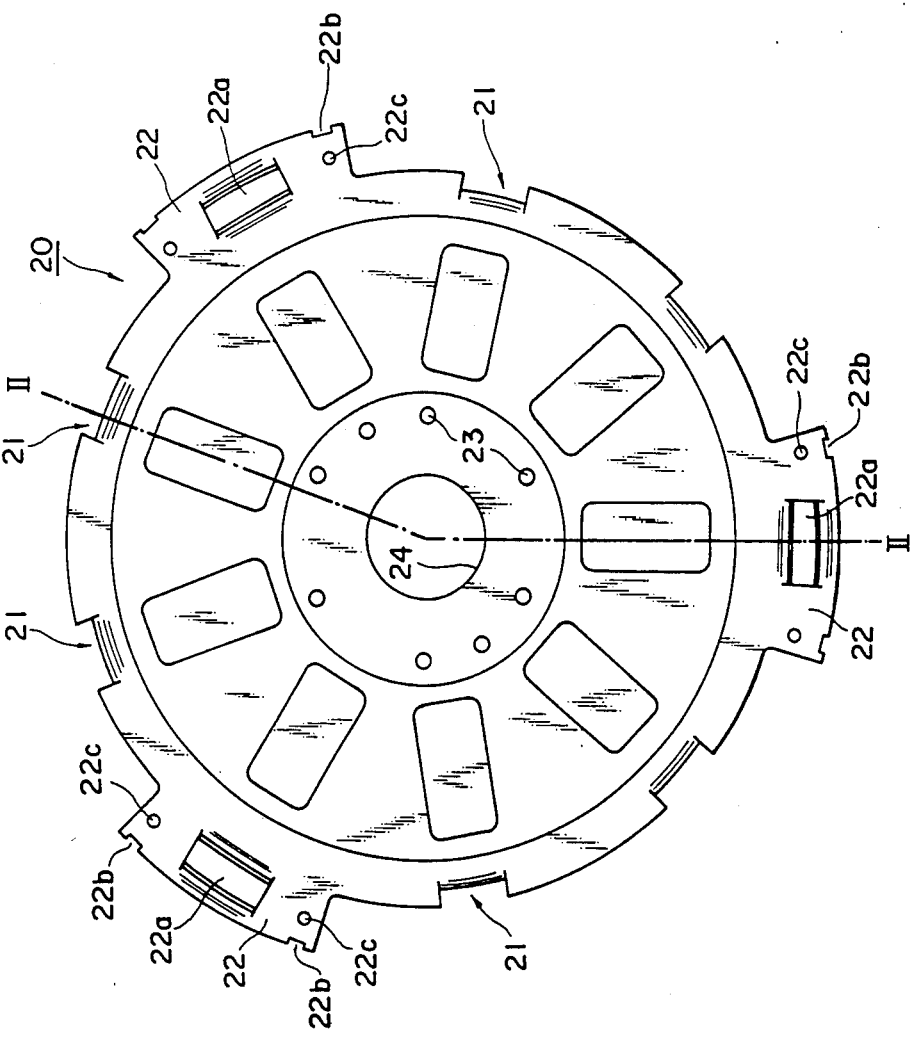

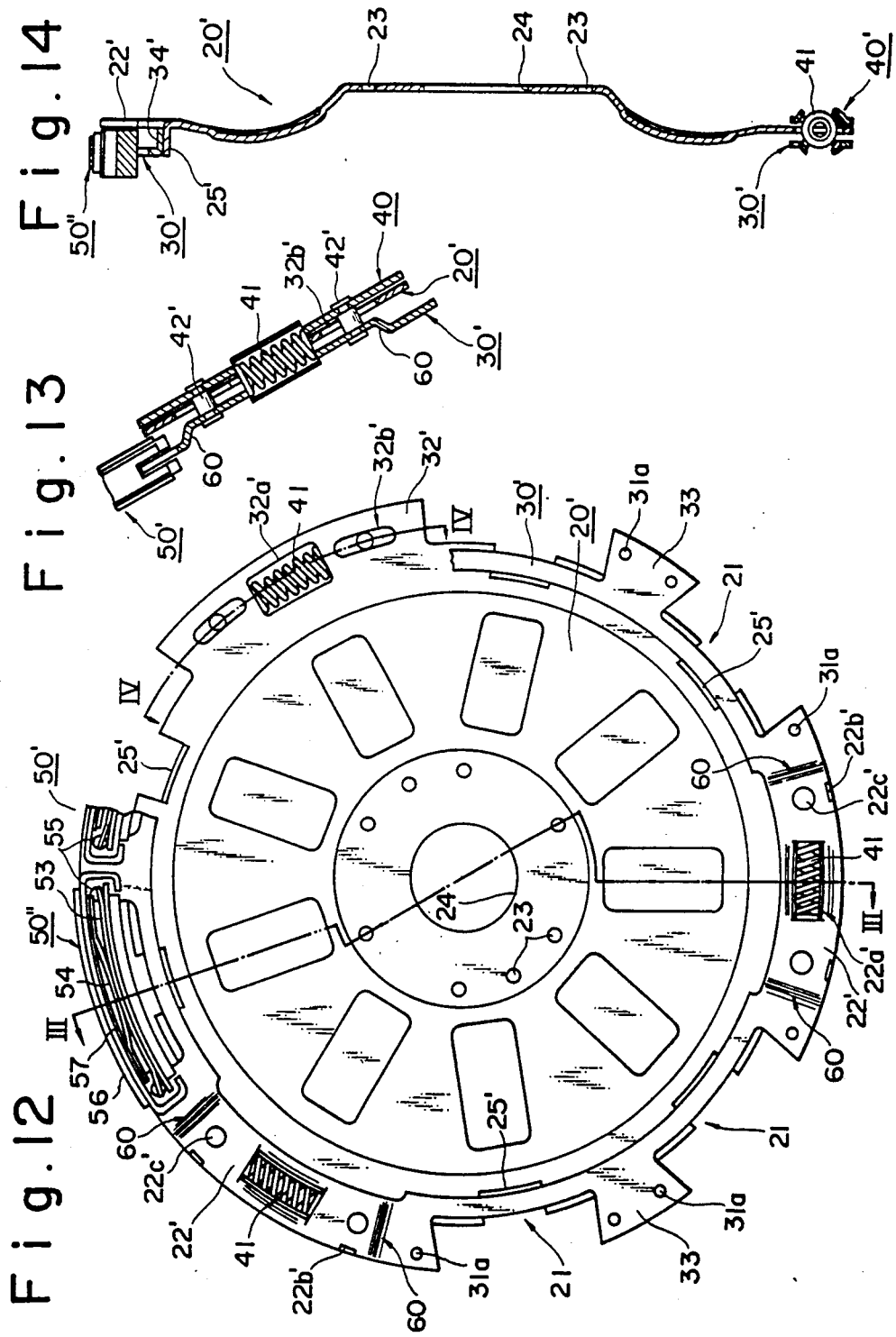

SPEED RESPONSIVE CENTRIFUGAL CLUTCH WITH A SERIAL CIRCUMFERENTIAL ARRANGEMENT OF SHOE ASSEMBLIES AND DAMPERS

BACKGROUND OF THE INVENTION

1. Field of the Invention

This invention generally relates to a rotary power transmitting coupling device, and, in particular, to a speed responsive centrifugal clutch suitable for use as a lock-up clutch in a torque converter.

2. Description of the Prior Art

In a torque converter, there is commonly used a lock-up clutch which establishes a mechanical coupling by bringing an input shaft on the driving side into frictional contact with an output shaft on the driven side as the rotational speed increases thereby increasing the centrifugal force. Such a lock-up clutch is well known in the art and it commonly includes a shoe assembly which is brought into frictional contact with the driving surface which moves radially outward as the rotational speed and hence the centrifugal force increases. A typical shoe assembly is disclosed in U.S. Pat. No. 4,305,493 issued to Silberschlag on Dec. 15, 1981 and U.S. Pat. No. 4,226,309 issued to Silberschlag on Oct. 7, 1980.

As described in U.S. Pat. No. 4,117,918 issued to Silberschlag on Oct. 3, 1978, it is also known to provide a damper in such a lock-up clutch so as to obtain a smooth transmission of power from the driving side to the driven side through the shoe assembly. It is true that the power transmission can be carried out smoothly with the provision of such a damper, but this would tend to make the entire structure larger in size and heavier in weight. Since the lock-up clutch itself is already relatively large in size, a further addition of size would bring about various disadvantages, such as difficulty in handling and installation, heavy weight and high manufacturing cost.

SUMMARY OF THE INVENTION

It is therefore a primary object of the present invention to obviate the disadvantages of the prior art as described above and to provide an improved rotary power transmitting assembly.

Another object of the present invention is to provide an improved speed responsive centrifugal clutch assembly which is smooth and reliable in operation.

A further object of the present invention is to provide an improved speed responsive centrifugal clutch assembly compact in size, easy to manufacture and thus low in manufacturing cost.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic illustration showing how the present clutch is assembled in the torque converter shown in FIG. 1;

FIG. 3 is an enlarged, cross-sectional view taken along line I—I indicated in FIG. 2;

FIG. 4 is a plan view showing the overall structure of clutch plate 20;

FIG. 5 is a cross-sectional view taken along line II—II in FIG. 4;

FIG. 12 is a schematic illustration showing a speed responsive clutch assembly constructed in accordance with another embodiment of the present invention;

FIG. 13 a cross-sectional view taken along line IV—IV indicated in FIG. 12; and

FIG. 14 is a cross-sectional view taken along line III—III also indicated in FIG. 12.

DESCRIPTION OF THE PREFERRED EMBODIMENTS

Figure 1:
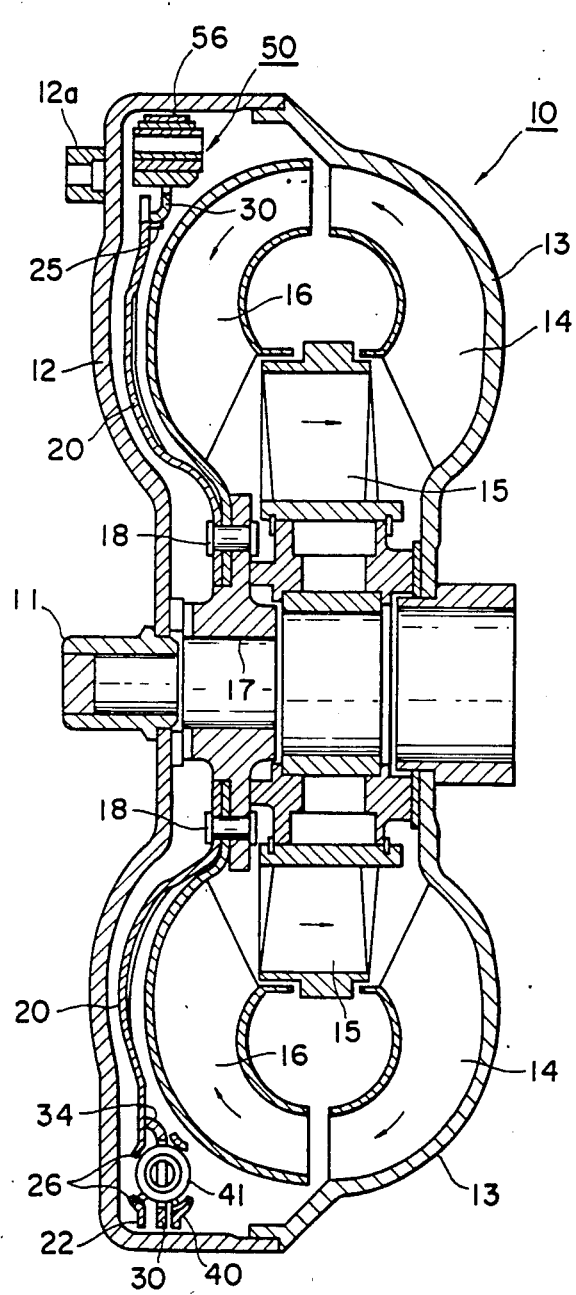
FIG. 1 is a schematic cross-sectional view showing a clutch assembly constructed in accordance with one embodiment of the present invention when applied to a torque converter.

Referring now to FIG. 1, there is schematically shown in cross-section a speed responsive centrifugal clutch assembly applied to torque converter 10 as a lock-up clutch. As shown, torque converter 10 includes an input shaft 11 defining a driving side of converter 10. A cover 12 is integrally fixed to input shaft 11, and provided with a plurality of fixed projections 12a (only one of which is shown in FIG. 1) arranged circumferentially, through which cover 12 and thus input shaft 11 is coupled to a prime mover, such as an internal combustion engine. A casing 13 is also integral with cover 12. Casing 13 is provided with a pumping impeller 14, so that when the cover 12 is driven to rotate, by for example, internal combustion engine, the casing 13, and pumping impeller 14 rotate in unison. Torque converter 10 also includes a turbine impeller 16 which is driven to rotate by means of a working fluid which flows in the direction indicated by the arrows, and by a stator 15. Turbine impeller 16 is mounted on turbine hub 17 by rivets 18. Turbine hub 17 serves as an output shaft and is coupled to a turbine shaft which defines a driven side of converter 10.

With above described structure, the cover 12 at the driving side and the turbine hub 17 at the driven side are operatively coupled through a working fluid contained in converter 10 so that the rotary power can be transmitted from cover 12 to turbine hub 17 through the working fluid. Torque converter 10 shown in FIG. 1 also includes a lock-up clutch which operates to establish a mechanical coupling between the driving side and the driven side through frictional contact. Specifically, a generally disc-shaped clutch plate 20 is attached to turbine hub 17 through rivets 18 and clutch plate 20 is provided with a plurality of friction shoe assemblies 50 at appropriate positions along the outer peripheral circumference through a reaction ring 30. As will be described in detail later, reaction ring 30 is carried on and held in position by the clutch plate 20, and reaction ring 30 generally rotates in unison with clutch plate 20; however, it is so structured that reaction ring 30 can rotate relative to clutch plate 20 over a predetermined angle.

Shoe assembly 50 is so mounted on reaction ring 30 that it can move radially outward relative to reaction ring 30. Accordingly, as the rotational speed of turbine impeller 16 and thus clutch plate 20 increases thereby increasing the centrifugal force applied to shoe assembly 50, shoe assembly 50 moves radially outward relative to reaction ring 30 and finally shoe assembly 50 takes a position in which its lining 56 comes into frictional contact with the inner surface of cover 12, whereby a mechanical coupling is established between cover 12 and output shaft 17 through frictional contact. On the other hand, as the rotational speed decreases, reducing centrifugal force applied to the shoe assembly 50, since shoe assembly 50 is normally biased radially inward due to the recovery force of a spring (not shown), it moves radially inward by overcoming the decreased centrifugal force, thereby releasing the contact between lining 56 and the inner surface of cover 12.

As shown at the bottom of FIG. 1, interposed between clutch plate 20 and reaction ring 30 carried thereby, is a coil spring 41 (hereinafter, also referred to as a damper spring) as a damper member between the relative rotational motion of clutch plate 20 and reaction ring 30. As will be described in detail later, damper spring 41 is held between the clutch plate 20 and reaction ring 30 by means of a retainer plate 40, and it is so structured that when the rotational force or torque is transmitted from the cover 12 to reaction ring 30 through shoe assembly 50 with lining 56 in contact with cover 12, the rotational force is transmitted to the clutch plate 20 from reaction ring 30 through damper spring 41 instead of direct transmission between clutch plate 20 and reaction ring 30. With this structure, even in the case where the rotational force is transmitted from cover 12 to turbine hub 17 via clutch plate 20 through a direct mechanical contact, a transmission of power can be carried out extremely smoothly.

Of importance, in accordance with one aspect of the present invention, damper spring 41 as described above is disposed at the same radial position as that of shoe assembly 50. Thus, damper spring 41 and shoe assembly 50 are circumferentially aligned with respect to clutch plate 20. As is also obvious from FIG. 1, damper spring 41 and shoe assembly 50 are both relatively large in cross-sectional size, but with damper spring 41 and shoe assembly 50 circumferentially aligned and disposed substantially along the outer periphery of clutch plate 20, the entire structure can be made smaller in size, in particular in the axial direction, so that the entire structure can be made compact in size and light in weight.

FIG. 2 schematically shows how clutch plate 20 and reaction ring 30 are assembled and how shoe assembly 50 (indicated as 50' and 50'' in FIG. 2) and damper spring 41 are arranged radially as well as circumferentially. As shown in FIG. 2, in the illustrated embodiment, there are provided six shoe assemblies 50 and three damper springs 41 (two shoe assemblies 50 and three damper springs 41 are, in fact, shown in FIG. 2) arranged along the same circumference or at the same radial distance from center of the clutch plate 20. As will be described in detail later, shoe assemblies 50 can move in the radial direction with respect to reaction ring 30 depending on the magnitude of the centrifugal force acting thereon. Shoe assembly 50' is shown at its retracted position with the application of substantially no centrifugal force thereon; whereas, the shoe assembly 50'' is shown at its operating position which is radially outward of the retracted position with the application of a large centrifugal force thereon. Thus, in the case of shoe assembly 50'', lining 56 is in frictional contact with cover 12 thereby establishing a lock-up condition.

FIG. 3 is a cross-sectional view taken along line I—I indicated in FIG. 2. It illustrates the structure of a hysteresis applying section joined by rivet 42 which provides a hysteresis characteristic in the relative rotational movement between reaction ring 30 and clutch plate 20 through damper member 41 (not shown in FIG. 3). This hysteresis applying section is illustrated further in detail in FIG. 7 in perspective. Its detailed description will be given later. Briefly described, when reaction ring 30 is either brought into contact with or separated from cover 12 through shoe assembly 50, the hysteresis applying section provides a hysteresis in the damping characteristic between reaction ring 30 and clutch plate 20 in order to insure a smooth transmission of power between reaction ring 30 and clutch plate 20 through damper spring 41.

FIG. 4 is a plan view showing the overall structure of clutch plate 20, which is generally disc-shaped. Along the outer periphery of clutch plate 20 are provided shoe assembly mounting sections 21 at six locations. Each of shoe assembly mounting sections 21 has a part bent toward one side (underside in FIG. 4) to form a tab 25. In the illustrated embodiment, shoe assembly mounting sections 21 are shown arranged two in succession. Since there are provided six shoe assembly mounting sections 21, there are provided six tabs 25 one in each of shoe assembly mounting sections 21 all at the same radial distance from the center of clutch plate 20. Reaction ring 30 rotates relative to clutch plate 20, slidingly guided by these tabs 25 thereby changing the relative angular relation between the reaction ring 30 and clutch plate 20.

Also along outer periphery of the clutch plate 20 are formed three damper mounting projections 22 spaced apart from one another over 120°. Each of projections 22 is provided with a generally rectangular window 22a at its center and also with a pair of pin inserting holes 22c, 22c on both sides thereof. In addition, each projection 22 is provided with a pair of cut-away portions 22b, 22b at both sides of its periphery. At center of the clutch plate 20 is formed a center hole 24 through which turbine hub 17 can be inserted, and a plurality of mounting holes 23 are also provided at appropriate locations around center hole 24. As shown in FIG. 1, the clutch plate 20 may be fixedly mounted on turbine hub 17 with rivets 18 fitted into holes 23.

FIG. 5 is a cross-sectional view of clutch plate 20 taken along line II—II indicated in FIG. 4. In FIG. 5, it is shown that a portion of the shoe assembly mounting section 21 is bent approximately 90° to define tab 25, and, furthermore, it is shown that the top and bottom edges of the window 22a formed in the damper mounting projection 22 are bent slightly in the direction opposite to the bending direction of tab 25 to form inclined sections 26. With the provision of such a pair of inclined sections 26, damper spring 41 may be held stably in position between clutch plate 20 and reaction ring 30.

Figure 6:
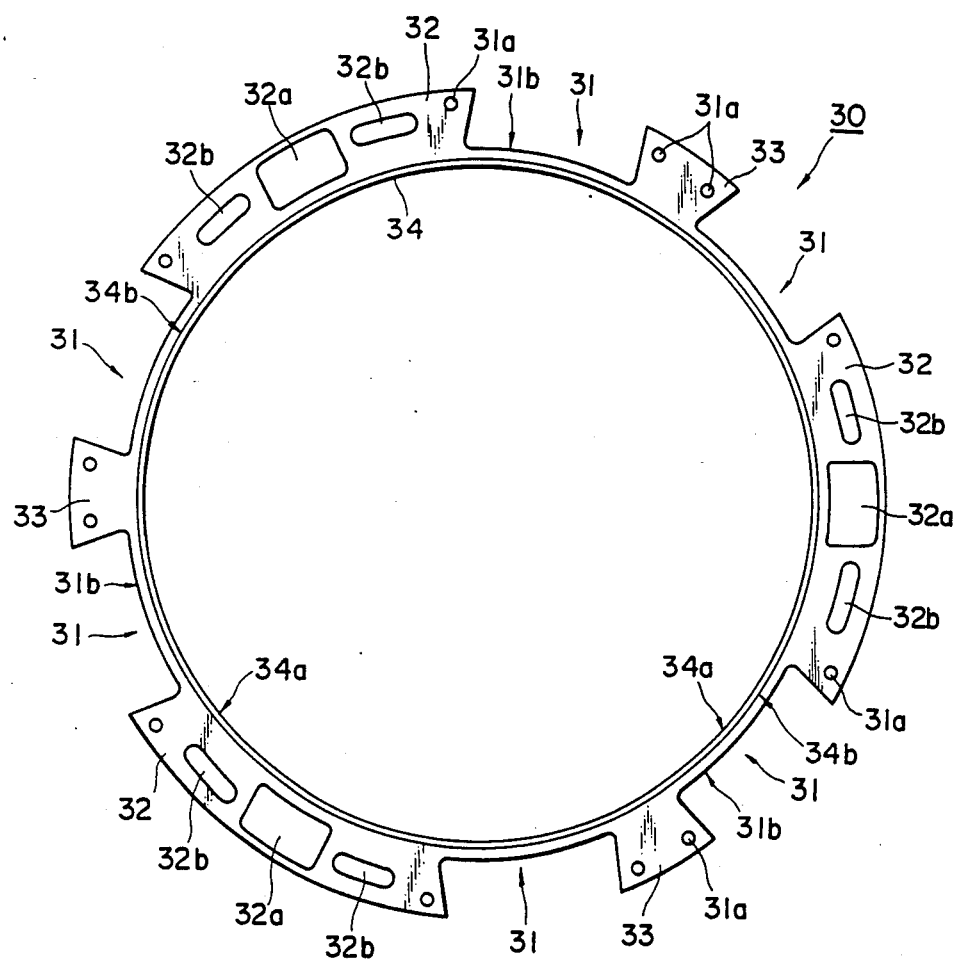
FIG. 6 is a plan view showing the overall structure of reaction ring 30.

FIG. 6 is a plan view showing the overall structure of reaction ring 30, which is formed with six shoe assembly mounting sections 31 arranged circumferentially at appropriate locations corresponding to the structure of the before-described clutch plate 20 and also with three damper mounting projections 32 arranged angularly symmetrically at equal angular intervals of 120°. Along the inner periphery of reaction ring 30 is formed a flange section 34 which extends axially over a short distance with the top of this flange section 34 being brought into sliding contact with clutch plate 20 when assembled. It can be structured so that tab 25 of clutch plate 20 is in sliding contact with any one of flange inner peripheral side 34a, flange outer peripheral side 34b or bottom peripheral edge 31b of shoe assembly mounting section 31, as desired. Between a pair of adjacent shoe assembly mounting sections 31, 31 is formed an intermediate projection 33. A pair of mounting holes 31a, 31a are provided on both sides of each of shoe assembly mounting sections 31.

Damper mounting projection 32 is provided with a generally rectangular holding hole 32a at its center so that damper spring 41 can be set in position in this holding hole 32a. On both sides of holding hole 32a are provided slots 32b, 32b. As will be described later, these slots 32b. determine the range of relative angular movement between reaction ring 30 and clutch plate 20 by their length in the circumferential direction.

Figure 7:
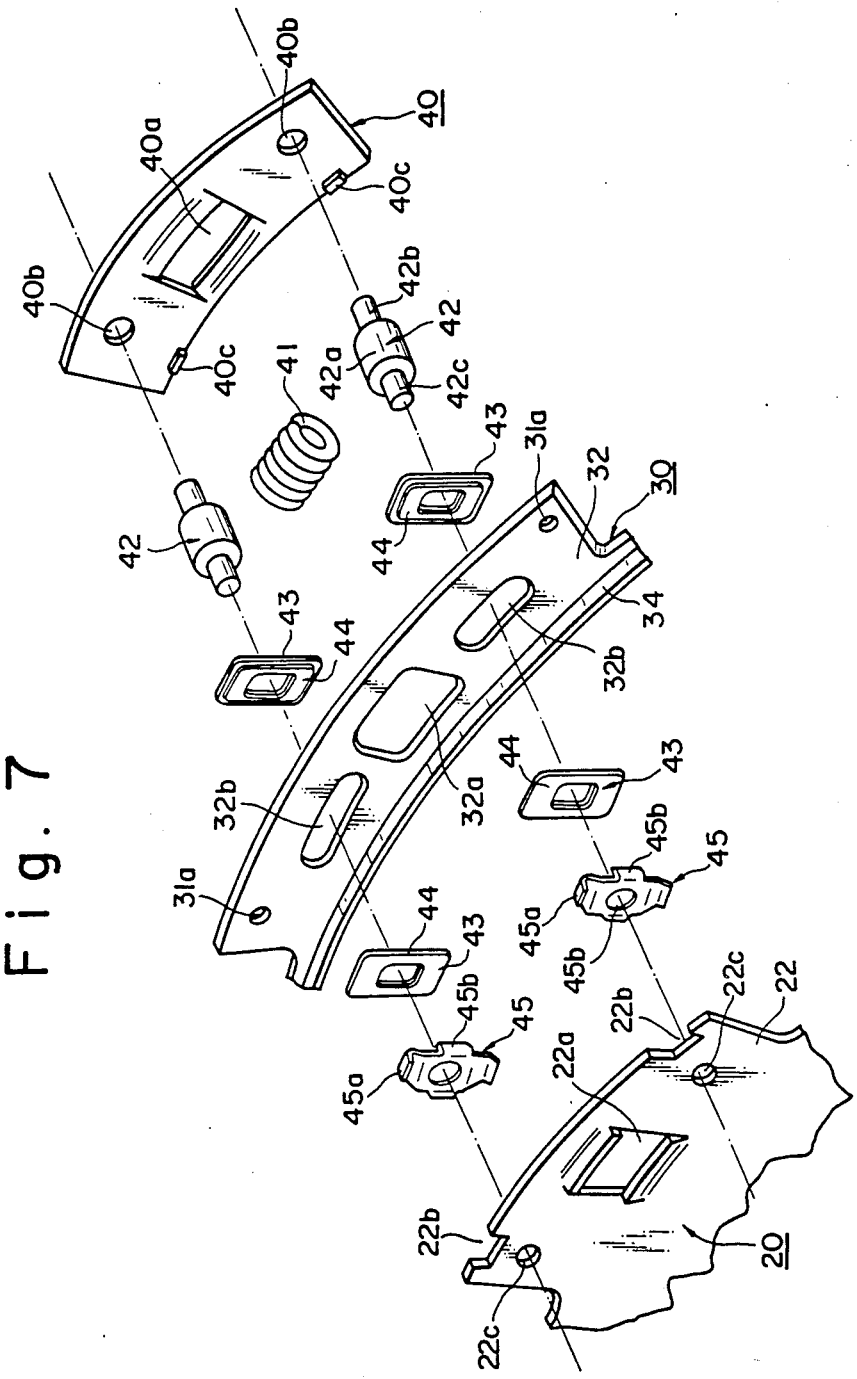
FIG. 7 is an exploded, perspective view showing the detailed structure of a damper section provided in the clutch assembly shown in FIG. 1.

FIG. 7 is a perspective view showing the detailed structure of the damper mounting and hysteresis applying sections. These sections will now be described in detail also with reference to FIGS. 2 and 3. Projection 22 of clutch plate 20 is located opposite to projection 32 of reaction ring 30 with a retainer spring 45 and a facing plate 43 for holding a facing 44 sandwiched therebetween. Retainer plate 40 is attached to the side of projection 32 of reaction ring 30 opposite to the side where clutch plate 20 is located with another similar facing plate 43 which holds another facing 44. Retainer spring 45 has a particular shape which includes a top bent section 45a fitted into the corresponding cut-away portion 22b of the clutch plate 20 when assembled thereby preventing self-rotation thereof during operation. Retainer spring 45 presses facings 44 against the projections 32 from both sides through facing plates 43. Retainer spring 45 also includes a pair of side bent sections 45b which serves to hold facing plate 43 therebetween thereby preventing it from being rotated. Retainer plate 40 is provided with a pair of projections 40c at its bottom, which are brought into abutment against the bottom of the respective facing plates 43 thereby preventing facing plates 43 from being rotated during operation.

Retainer plate 40 and reaction ring 30 are mounted on clutch plate 20 through a pair of rivets 42, 42, each of which has a pair of smaller diameter sections 42b and 42c which, in turn, are fitted into a circular hole 40b formed in retainer plate 40 and a circular hole 22c formed in clutch plate 20, respectively, with both their ends pressed thereby, causing rivets 42 to be integral with clutch plate 20 and retainer plate 40 in the axial direction. Each of the rivets 42, 42 has its larger diameter section 42a loosely extending through the corresponding slot 32b of reaction ring 30. Thus, the relative angular movement between reaction ring 30 and clutch plate 20 is limited by the relative positional relation between rivet 42 and slot 32b.

Figure 8A:
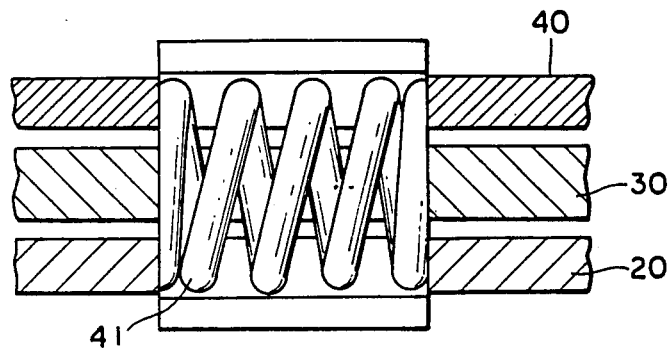
FIGS. 8a and 8b are schematic illustrations which are useful for explaining the function of the damper section.
Figure 8B:
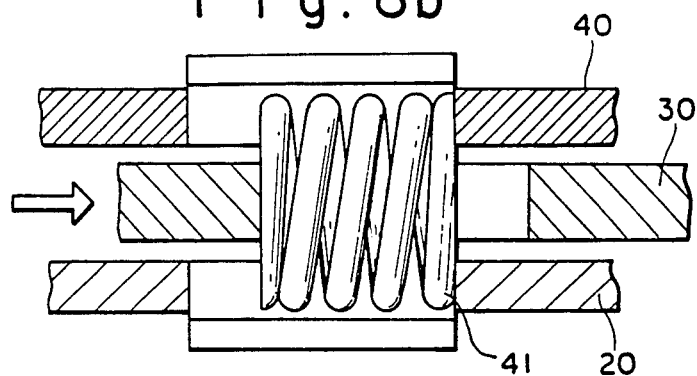
Figure 9:
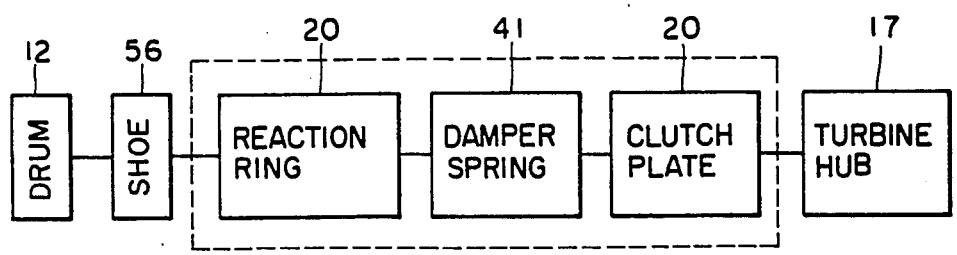
FIG. 9 is a block diagram showing the torque power transmitting path between the driving side and the driven side in the clutch assembly provided in the torque converter shown in FIG. 1.

When assembled, damper spring 41 is located in spring holding hole 32a of reation ring 30. Damper spring 41 is also partly received in windows 22a and 40a of clutch plate 20 and retainer plate 40, respectively, so that damper spring 41 is in engagement with clutch plate 20 and retainer plate 40. Thus, as will be described later, when reaction plate 30 receives rotational force through shoe assembly 50, its rotational force is transmitted to clutch plate 20 through damper spring 41. This power transmitting function is schematically shown in FIGS. 8a and 8b. The path for transmitting the rotational force under a lock-up condition is illustrated in block form in FIG. 9.

FIGS. 10a through 10e show the detailed structure of shoe assembly 50 and how it operates under different rotational speeds. Generally, shoe assembly 50 includes a lining 56 which is contactable with the inner peripheral surface of cover 12, a shoe 51 for holding the lining 56, a weight 52, a retractor spring 53, a main spring 54 and a pair of pins 55, 55. The present centrifugal lock-up clutch provided with shoe assembly 50 functions as a torque limiter. A typical torque performance curve in such a case is graphically shown in FIG. 11. The curve has four characteristic regions depending on the rotational speed. Generally, the torque capacity increases quickly at low and medium speed regions and does not increase so much at high speed regions.

Figure 10A:
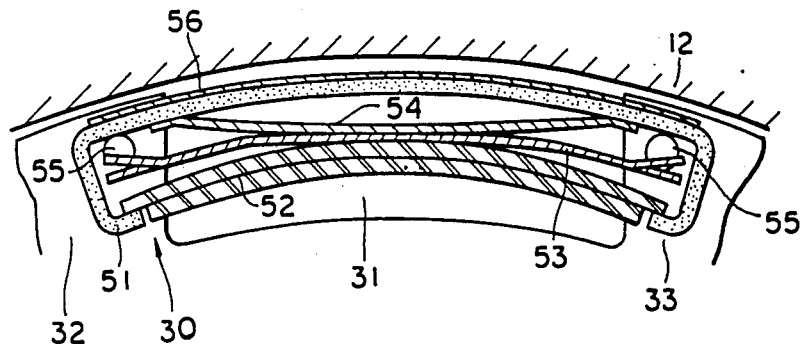
FIGS. 10a, 10b, 10c, 10d and 10e are schematic illustrations showing the various states of the shoe assembly 50 at representative speed ranges.
Figure 10B:
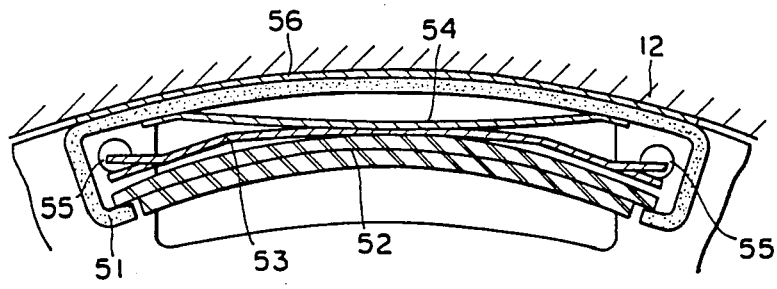

Now, the operation of shoe assembly 50 will be described with respect to each of the four rotational speed regions. In the torque curve of FIG. 11, the region indicated by A is a low speed (non-operating) region. The state of shoe assembly 50 in this region is illustrated in FIG. 10a. That is, the recovery force of retractor spring 53 is larger than the combined centrifugal force acting on lining 56, shoe 51 and weight 52 so that lining 56 is located at its retracted position, separated from the inner peripheral surface of cover 12. Accordingly, the clutch is in a decoupled condition so that no transmission of torque takes place. As the rotational speed gradually increases and the combined centrifugal force acting on the above-described elements including lining 56 exceeds slightly recovery force of the retractor spring 53, lining 56 comes into contact with cover 12 so that the transmission of torque from cover 12 to reaction ring 30 through shoe 51 is initiated. This condition is illustrated in FIG. 10b and corresponds to a point A' indicated in the torque characteristic curve of FIG. 11.

Figure 10C:
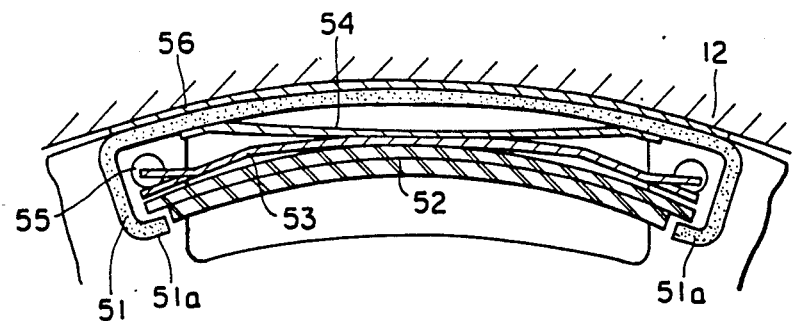
Figure 11:
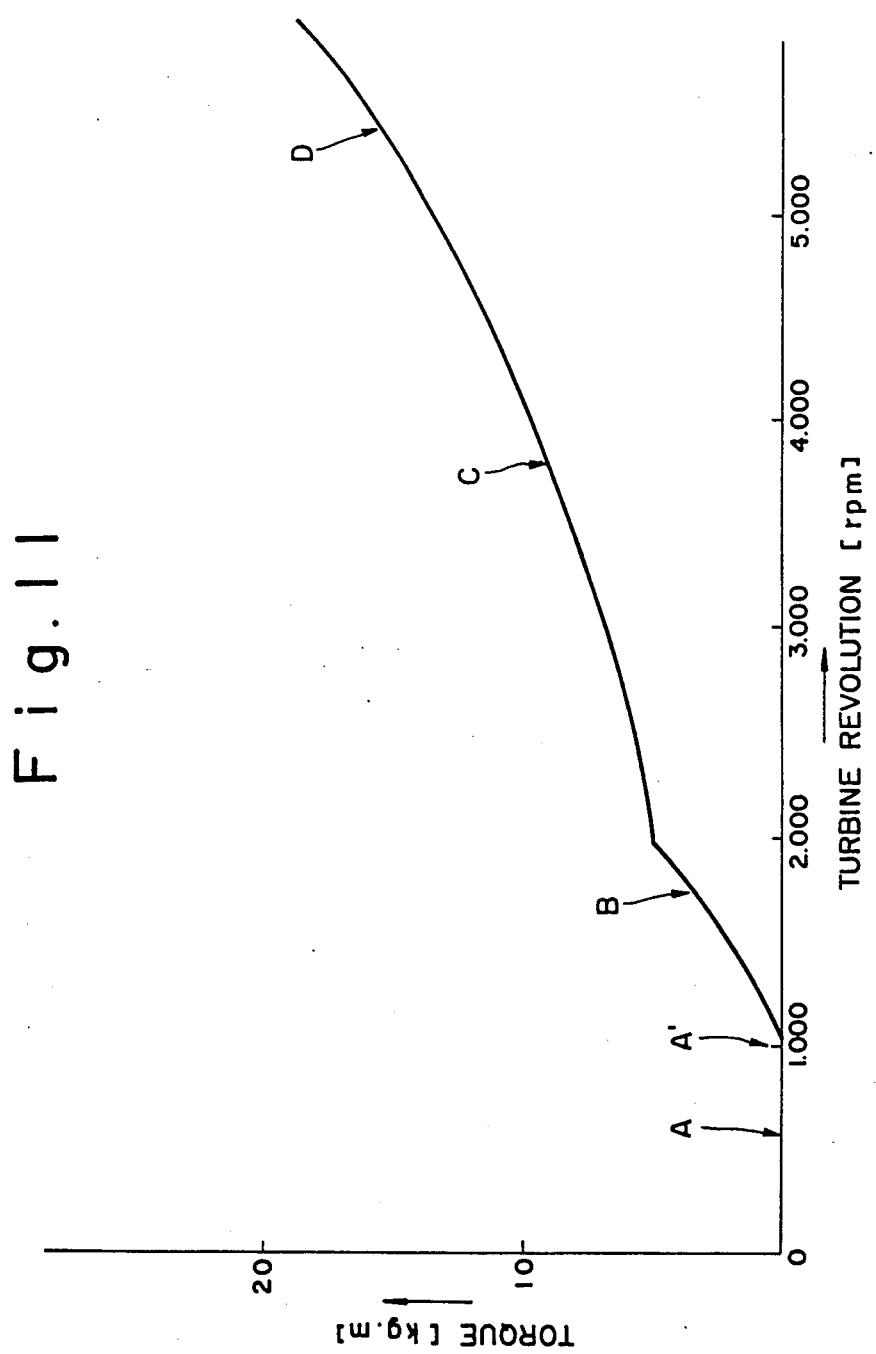
FIG. 11 is a graph showing a typical torque performance curve of the present clutch assembly.

That portion of the torque curve of FIG. 11 which is indicated by B is a medium speed-low speed centrifugal clutch region, and the operating state of shoe assembly 50 is illustrated in FIG. 10c. In this case, main spring 54 deflects due to the centrifugal force acting on the weight 52 so that weight 52 moves away from the C-shaped bottom ends 51a of shoe 51 to be in a floating condition. The centrifugal force acting on weight 52 is partly transmitted to pins 55, 55 from retractor spring 53, but weight 52 predominantly serves to press lining 56 against cover 12 through main spring 54, thereby producing a force to transmit the torque. The centrifugal force acting on lining 56 and shoe 51 directly presses lining 56 against cover 12 irrespective of the movement of weight 52. Thus, in the B region, pressing force of the lining 56 required for transmission of torque is (centrifugal force acting on lining 56 and its shoe)+(centrifugal force acting on weight 52)−(recovery force of retractor spring 53). If the rotational speed is further increased to enhance the centrifugal force acting on the weight 52 thereby causing the main spring 54 to be more deflected, both ends of weight 52 come into engagement with the pins 55, 55 through retractor spring 53 so that weight 52 is prevented from moving radially outward any further.

Figure 10D:
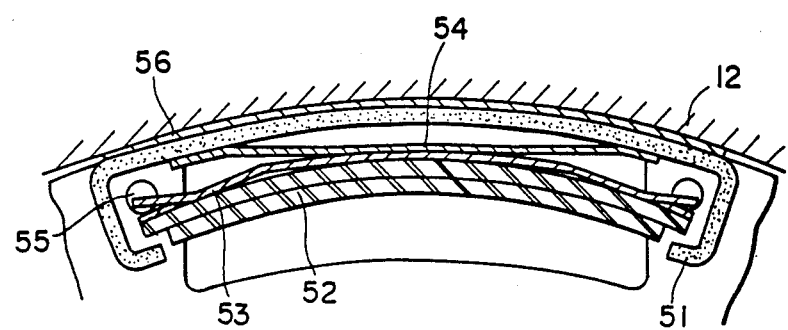

That portion of the torque curve of FIG. 11 which is indicated by C is a medium speed-high speed torque limiting region. The corresponding state of shoe assembly 50 is illustrated in FIG. 10d. In this case, since the rotational speed is high, weight 52 is held stationary against pins 55, 55 at both ends. The centrifugal force acting on weight 52 is bypassed directly from weight 52 to reaction ring 30 through pins 55, 55 and thus it is not transmitted to lining 56. Accordingly, in this speed region, the transmitting torque of the present clutch is determined solely by a frictional force resulting from the centrifugal force acting on lining 56 and its shoe 51, so that the rate of increase in torque as a function of increase in rotational speed is significantly decreased as compared with the previous region B, thereby establishing the torque limiting condition.

Figure 10E:
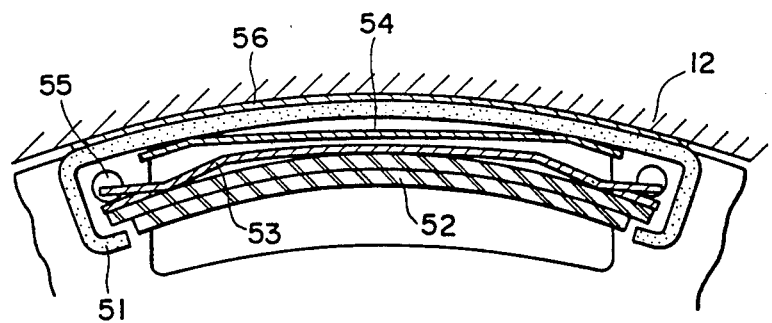

The final region of the torque curve of FIG. 11 indicated by D is a high speed region. The operating state of the shoe assembly for this condition is illustrated in FIG. 10e. In this condition, the main spring 54 is deflected significantly in the outward radial direction due to the centrifugal force acting thereon, and it is separated from the weight 52 and the retractor spring 53, so that the upward pressing load of weight 52 to press main spring 54 against cover 12 is removed. In region C, the centrifugal force acting on main spring 54 is cancelled out by the pressing load applied by weight 52, but in region D, the centrifugal force acting on main spring 54 is transmitted directly to lining 56 so that the transmitted torque of the present clutch is increased by that amount, thereby increasing the torque capacity slightly.

Now, another embodiment of the present invention will be described with reference to FIGS. 12 through 14. In the previous embodiment, reaction ring 30 for carrying shoe assembly 50 was interposed between clutch plate 20 and retainer plate 40; however, in the present embodiment, clutch plate 20' is interposed between reaction ring 30' and retainer plate 40'. In the embodiment shown in FIGS. 12 through 14, those elements corresponding to the elements shown in the previous embodiment are indicated by the same reference numerals with a prime, and identical elements are indicated by identical numerals. Clutch plate 20' is provided with a plurality of tabs 25' at the side opposite to the side in the previous embodiment, and these tabs 25' serve to slidingly guide a flange portion 34' of reaction ring 30'. Furthermore, reaction ring 30' is provided with a pair of stepping portions 60, 60 in each of damper mounting sections 22' thereby defining a portion of the reaction ring 30' which is located locally closer to clutch plate 20'. With this structure, a damper spring 41 of smaller diameter can be used advantageously.

In this embodiment, as shown in FIG. 13, there is provided no hysteresis applying section at the location of rivet 42' which holds clutch plate 20', reaction ring 30' and retainer plate 40' in unison. In order to provide hysteresis in the damper characteristic of damper spring 41, in the present embodiment, a hysteresis applying mechanism similar in structure to that of the previously described embodiment shown in FIG. 3 can also be provided in the present embodiment, if desired.

Furthermore, in shoe assembly 50 provided in each of the embodiments shown in FIGS. 2 and 12 (the one in the non-operating state is indicated by 50' and the one in the operating state is indicated by 50"), a shoe weight 57 is additionally provided as compared with the shoe assembly structure shown in FIGS. 10a through 10e. This shoe weight 57 is formed separately and assembled into shoe assembly 50. When assembled, it is functionally integrated with shoe 51 thereby operating as part of shoe 51. With this structure, there can be easily provided a shoe assembly having differing characteristics simply by changing the weight or spring constant of shoe weight 57.

As described in detail above, in accordance with the present invention, there is provided a speed responsive centrifugal clutch assembly extremely smooth in operation, compact in size, and light in weight. Besides, since the shoe assemblies and the damper members are arranged on the same circumference, its designing and manufacturing processes are greatly facilitated.

While the above provides a full and complete disclosure of the preferred embodiments of the present invention, various modifications, alternate constructions and equivalents may be employed without departing from the true spirit and scope of the invention. For example, use has been made of a spring as the damper member in the above-described embodiments, but use may also be made of any other elastic material, such as rubber. Therefore, the above description and illustration should not be construed as limiting the scope of the invention, which is defined by the appended claims.

What is claimed is:

1. A speed responsive centrifugal clutch assembly, comprising:
    a generally disk-shaped clutch plate fixedly mounted on a first rotary member;
    a reaction ring support to be rotatable relative to said clutch plate at one side thereof;
    a plurality of shoe assemblies supported by said reaction ring on an outeer periphery of said reaction ring so as to be movable radially outward until said shoe assemblies come into contact with a second rotary member as the centrifugal force acting thereon increases;
    a plurality of damper members operatively associated with said clutch plate and said reaction ring thereby transmitting a rotational force between said clutch plate and said reaction ring; and
    wherein said plurality of shoe assemblies and said plurality of samper members are spacedly disposed one after another substantially along the same circumference of said reaction ring, in series and independently from one another.

2. The clutch assmebly of claim 1 wherein said clutch asembly is a lock-up clutch for use in a torque converter.

3. The clutch assembly of claim 1 wherein each of said plurality of damper members is comprised of coil springs.

4. The clutch assembly of claim 1 wherein each of said plurality of damper members is comprised of rubber.

5. The clutch assembly of claim 1 further comprising hysteresis applying means interposed between said clutch plate and said reaction ring, said hysteresis applying means applying a predetermined hysteresis characteristic to a relative rotational movement between said clutch plate and said reaction ring due to a recovery force of said damper member.

6. The clutch assembly of claim 1 wherein said first rotary member is a first rotary shaft on the driven side and said second rotary member is fixedly connected to a second rotary shaft on the driving side.

7. The clutch assembly of claim 1 further comprising limiting means for limiting a relative rotational movement between said clutch plate and said reaction ring over a predetermined angle.

8. The clutch assembly of claim 7 wherein said clutch plate is provided with a plurality of guide tabs arranged circumferentially and extended axially to one side thereof and said reaction ring is provided with a circular flange portion extending axially over a short distance, whereby said reaction ring is rotatably supported on said clutch plate and slidingly guided by said guide tabs.

9. The clutch assembly of claim 8 wherein said limiting means includes at least one pin provided in said clutch plate and at least one slot provided in said reaction ring with its elongated direction extending circumferentially whereby said pin is fitted in said slot thereby allowing limited relative rotational movement between said clutch plate and said reaction ring through the engagement between said pin and said slot.

10. The clutch assembly of claim 1 wherein said reaction ring is provided with a plurality of holes in each of which the corresponding one of said damper members is set.

11. The clutch assembly of claim 1 wherein said clutch plate is provided with a plurality of windows each located corresponding in position to said plurality of holes in said reaction ring thereby receiving said damper partly so as to allow transmission of the rotational force between said clutch plate and said reaction ring through said damper member.

12. The clutch assembly of claim 1 further comprising a retainer plate disposed at the side of said reaction ring opposite to the side where said clutch plate is disposed for each of said plurality of damper members.

* * * * *